A. K. EYCLESHYMER.
VALVE.
APPLICATION FILED MAY 16, 1917.
1,256,215. Patented Feb. 12, 1918.
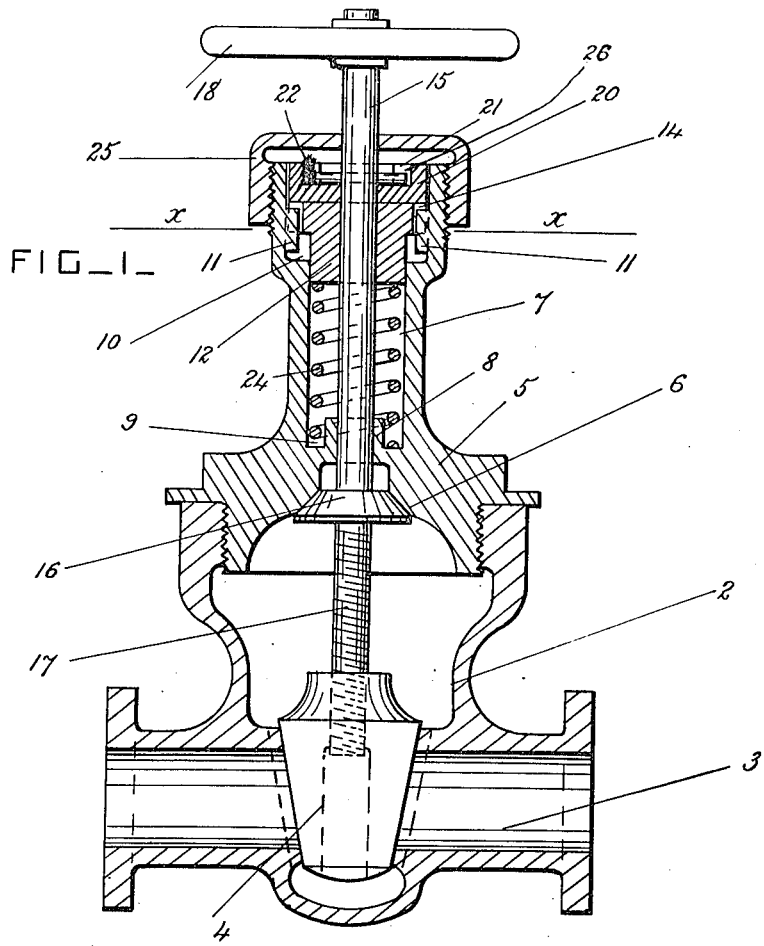
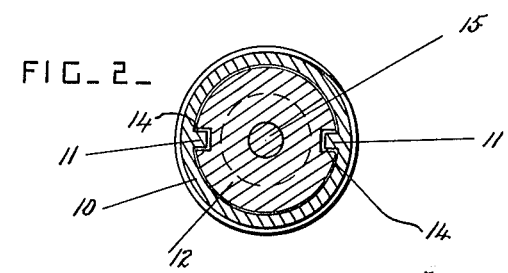
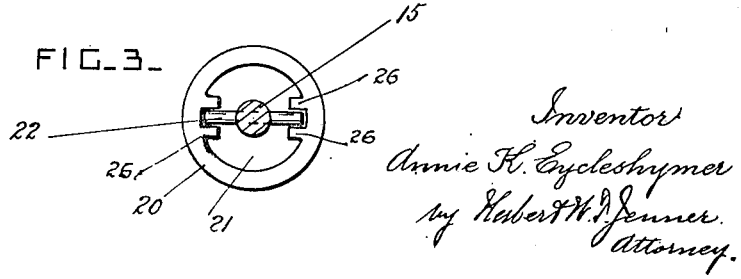
Inventor
Annie K. Eycleshymer
by Herbert W. Jenner
Attorney.

UNITED STATES PATENT OFFICE.

ANNIE K. EYCLESHYMER, OF GREENFIELD CENTER, NEW YORK.

VALVE.

1,256,215.

Specification of Letters Patent.  Patented Feb. 12, 1918.

Application filed May 16, 1917. Serial No. 168,973.

*To all whom it may concern:*

Be it known that I, ANNIE K. EYCLESHYMER, a citizen of the United States, residing at Greenfield Center, in the county of Saratoga and State of New York, have invented certain new and useful Improvements in Valves, of which the following is a specification.

This invention relates to hand operated valves provided with packingless stems and adapted to regulate the flow of fluids; and it consists in the novel construction and combination of the parts hereinafter fully described and claimed.

In the drawings, Figure 1 is a vertical section through a valve constructed according to this invention. Fig. 2 is a cross-section, taken on the line $x$—$x$ in Fig. 1; and Fig. 3 is a plan view of the washer, showing the valve stem in section.

The valve is provided with a casing 2, having a passage 3 for the steam, water, or other fluid. A main valve 4 is provided for regulating the flow of fluid through the passage 3, and this valve may be a gate valve, as shown, or a valve of any other approved construction, such as a disk valve. The casing 2 is provided with a cover 5 at its top, and this cover has an annular seat 6 at its lower part, and a spring chamber 7 at its middle and upper parts. A lip 8 is arranged to project upwardly from the bottom of the spring chamber and so as to form an annular groove 9 at the bottom of the chamber.

At the upper end portion of the chamber 7 an enlargement or block chamber 10 is provided, and this block chamber has two inwardly projecting guide lugs 11.

A non-revoluble thrust block 12 is arranged to slide vertically in the block chamber 10 and in the upper end portion of the spring chamber 7, and 14 are grooves in the thrust block 12 which engage with the lugs 11 and prevent the thrust block from revolving.

A valve stem 15 is provided and is revoluble in a central hole of the thrust block. This valve stem has a collar 16 formed on or secured to its middle part, and this collar engages constantly with the seat 6 so that no fluid can pass upwardly from the casing at this point. The lower end portion 17 of the valve stem is screwthreaded, and it engages with a screwthreaded hole in the valve 4, and the said valve 4 is raised and lowered by rotating the valve stem in a suitable direction. The upper end portion of the valve stem is provided with an operating wheel 18.

A washer 20 is slipped over the valve stem and bears against the top of the thrust block 12, and this washer has a recess 21 in its upper side. A pin 22 is provided and projects crosswise through a hole in the valve stem, and its ends engage with the lugs 26, arranged in pairs at the opposite sides of the recess in the washer so that the pin cannot slip out of its hole in the valve stem, and so that the washer is constrained to revolve with the valve stem.

A helical spring 24 is arranged in the spring chamber below the thrust block, and its lower end engages in the annular groove 9. The upper part of the thrust block is made of larger diameter than its lower part which slides in the spring chamber, and a separate chamber is provided for its upper part to slide in, so that the projecting guide lugs 11 may not interfere with the introduction and removal of the helical spring. A cap 25 is provided and is secured to the upper part of the block chamber in any approved way. This cap has a hole for the valve stem to project through, and it incloses the washer and prevents dirt from entering at this point.

The helical spring holds the collar 16 to its seat, so that the valve stem requires no packing material to keep it tight.

The cross pin is inserted through the hole in the valve stem after first pressing the washer and thrust block downwardly, and these parts are then pressed upwardly by the helical spring so that the pin is held in engagement with the bottom wall of the recess in the washer. The cap 25 prevents the entrance of dirt to the thrust block chamber, and the liberal bearing surface of the washer on the thrust-block, and the provision of lugs 26 and guides 11 upon opposite sides of the axis of the valve stem enables the valve to be operated by hand with facility, and prevents the parts from sticking when the valve is not in regular and frequent use.

What I claim is:

1. In a packingless valve, a valve casing provided at its upper part with a spring chamber and a thrust-block chamber of larger diameter than the spring chamber, said thrust-block chamber having guide lugs on opposite sides of it, a valve in the casing, a rotatable non-reciprocating valve stem for operating the valve, said stem being provided with a collar for preventing fluid from passing upwardly around it into the spring chamber, a thrust-block encircling the valve stem and having grooves which slide on the said guide lugs, a spring arranged in the spring chamber and pressing the thrust-block upwardly, a washer arranged in the thrust-block chamber above the thrust-block and secured on the said valve stem, and a cap secured to the valve casing and closing the upper end of the thrust block chamber.

2. In a packingless valve, a valve casing provided at its upper part with a spring chamber and a thrust-block chamber of larger diameter than the spring chamber, said thrust-block chamber having guide lugs on opposite sides of it, a valve in the casing, a rotatable non-reciprocating valve stem for operating the valve, said stem being provided with a collar for preventing fluid from passing upwardly around it into the spring chamber, a thrust-block encircling the valve stem and having grooves which slide on the said guide lugs, a spring arranged in the said spring chamber and pressing the thrust-block upwardly, a washer arranged in the thrust-block chamber above the thrust-block and provided with a recess in its upper side having pairs of lugs at opposite sides of it, a pin in said recess secured to the said valve stem and engaging with the said pairs of lugs, and a cap secured to the valve casing and closing the upper end of the thrust-block chamber.

In testimony whereof I affix my signature.

ANNIE K. EYCLESHYMER.